United States Patent
Misaki

(10) Patent No.: US 11,525,244 B2
(45) Date of Patent: Dec. 13, 2022

(54) DISPLAY DEVICE FOR SHOVEL

(71) Applicant: SUMITOMO (S.H.I.) CONSTRUCTION MACHINERY CO., LTD., Tokyo (JP)

(72) Inventor: Youji Misaki, Chiba (JP)

(73) Assignee: SUMITOMO (S.H.I.) CONSTRUCTION MACHINERY CO., LTD., Tokyo (JP)

( * ) Notice: Subject to any disclaimer, the term of this patent is extended or adjusted under 35 U.S.C. 154(b) by 200 days.

(21) Appl. No.: 16/163,800

(22) Filed: Oct. 18, 2018

(65) Prior Publication Data

US 2019/0048560 A1 Feb. 14, 2019

Related U.S. Application Data

(63) Continuation of application No. PCT/JP2017/015971, filed on Apr. 21, 2017.

(30) Foreign Application Priority Data

Apr. 21, 2016 (JP) .............................. JP2016-085324

(51) Int. Cl.
*E02F 9/26* (2006.01)
*E02F 9/20* (2006.01)

(52) U.S. Cl.
CPC ............ *E02F 9/265* (2013.01); *E02F 9/2095* (2013.01); *E02F 9/26* (2013.01); *E02F 9/268* (2013.01)

(58) Field of Classification Search
CPC . E02F 9/265; E02F 9/2095; E02F 9/22; E02F 9/26; E02F 9/268
See application file for complete search history.

(56) References Cited

U.S. PATENT DOCUMENTS

| | | | |
|---|---|---|---|
| 7,751,954 B2 | 7/2010 | Matsuda et al. | |
| 2003/0093204 A1* | 5/2003 | Adachi | E02F 9/20 701/50 |
| 2005/0150142 A1 | 7/2005 | Matsuda et al. | |
| 2006/0287841 A1 | 12/2006 | Hoshi et al. | |
| 2007/0094055 A1* | 4/2007 | Nakayama | E02F 9/267 705/5 |

(Continued)

FOREIGN PATENT DOCUMENTS

| | | |
|---|---|---|
| EP | 2811080 | 12/2014 |
| JP | S57-119850 U | 7/1982 |
| JP | S59-096339 | 6/1984 |

(Continued)

OTHER PUBLICATIONS

English Translation of JP-2009235833-A (Year: 2009).*

(Continued)

*Primary Examiner* — Nicholas Kiswanto
*Assistant Examiner* — Jamal A Shah
(74) *Attorney, Agent, or Firm* — IPUSA, PLLC

(57) ABSTRACT

A display device for a shovel that includes an attachment including a boom, an arm, and an end attachment includes an operation analysis start input part and an operation analysis check input part. The operation analysis start input part is configured to be operated to start an operation analysis of the shovel and store the history of the operation analysis. The operation analysis check input part is configured to be operated to display the result of the operation analysis.

14 Claims, 10 Drawing Sheets

(56) References Cited

U.S. PATENT DOCUMENTS

2011/0301817 A1* 12/2011 Hobenshield ............ E02F 9/26
                                                                          701/50
2017/0298595 A1* 10/2017 Machida ................. E02F 9/261

FOREIGN PATENT DOCUMENTS

| JP | 2005-098073 | 4/2005 |
| JP | 2005-098076 | 4/2005 |
| JP | 2005-098988 | 4/2005 |
| JP | 2008-240361 | 10/2008 |
| JP | 2009-180196 | 8/2009 |
| JP | 2009-235833 | 10/2009 |
| JP | 2009235833 A * | 10/2009 |
| JP | 2010-203148 | 9/2010 |
| JP | 2011-038346 | 2/2011 |
| JP | 2015-040422 | 3/2015 |
| JP | 2015-121161 | 7/2015 |
| JP | 2015-209690 | 11/2015 |

OTHER PUBLICATIONS

Doishita Kenji, Operation Evaluation System and Operation Evaluation Method for Construction Machine, 2009. (Year: 2009).*
International Search Report for PCT/JP2017/015971 dated Aug. 1, 2017.

* cited by examiner

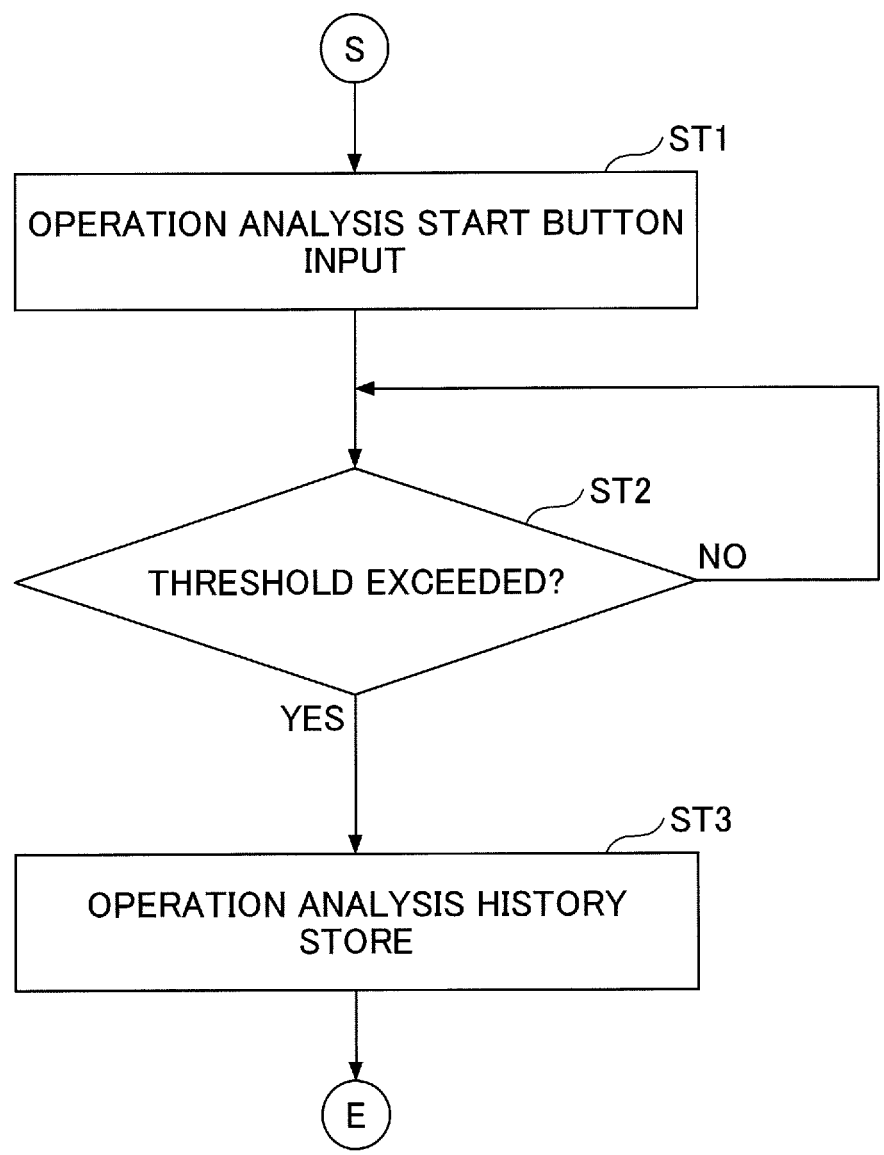

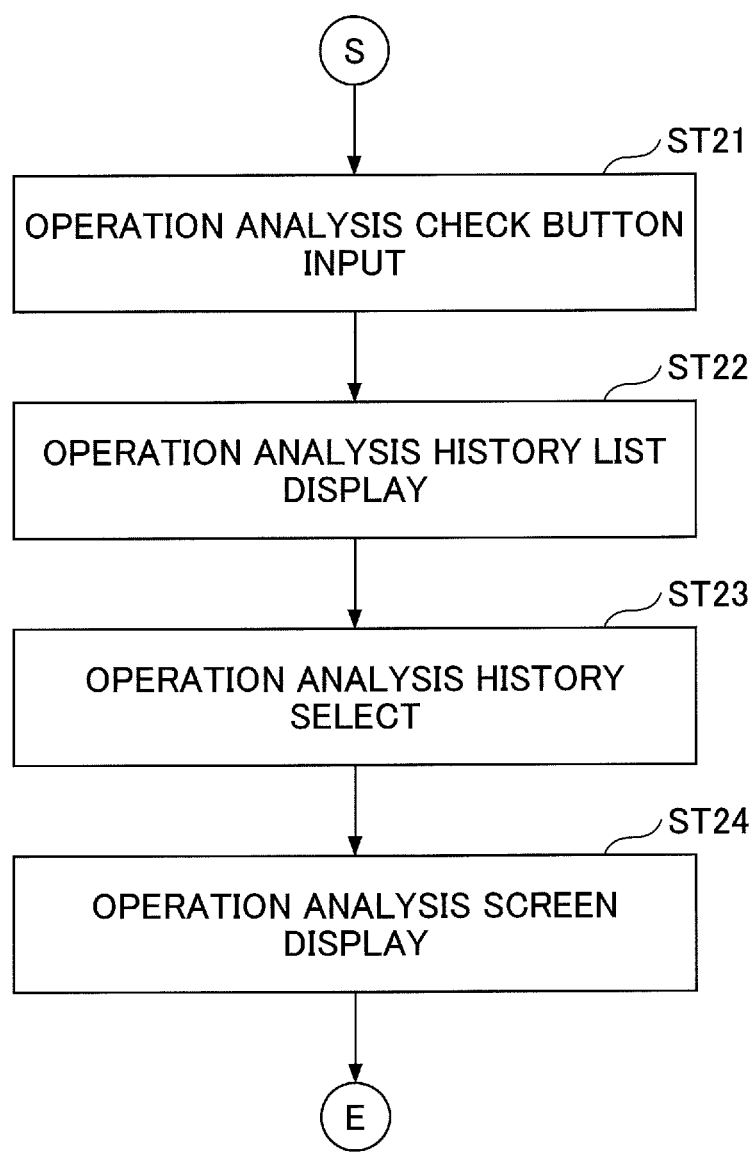

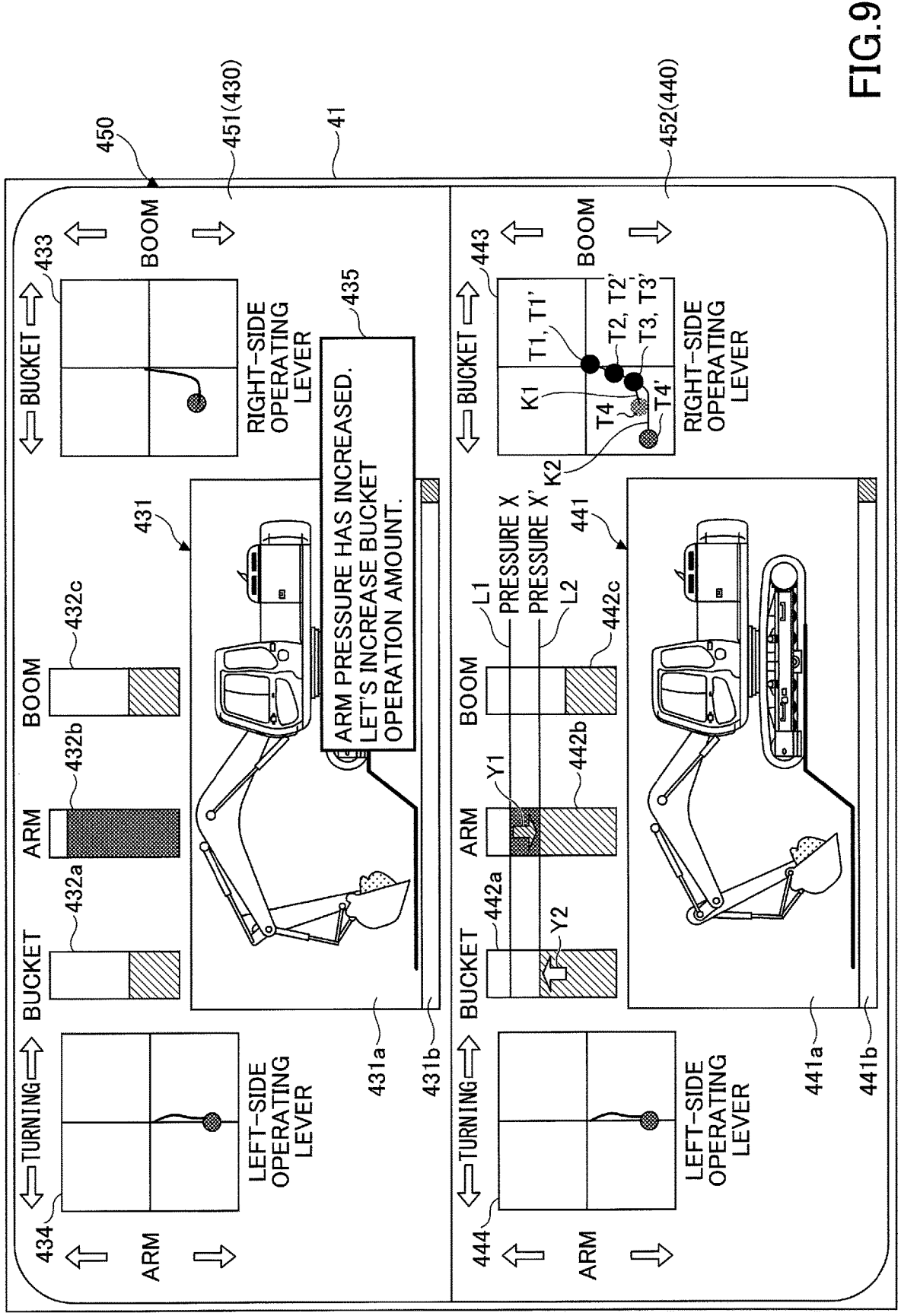

DISPLAY DEVICE FOR SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2017/015971, filed on Apr. 21, 2017 and designating the U.S., which claims priority to Japanese patent application No. 2016-085324, filed on Apr. 21, 2016. The entire contents of the foregoing applications are incorporated herein by reference.

BACKGROUND

Technical Field

The present invention relates to display devices for shovels.

Description of Related Art

A display device that displays a determination as to the appropriateness of fuel efficiency with respect to an operation on a construction machine is known.

SUMMARY

According to an aspect of the present invention, a display device for a shovel that includes an attachment including a boom, an arm, and an end attachment includes an operation analysis start input part and an operation analysis check input part. The operation analysis start input part is configured to be operated to start an operation analysis of the shovel and store the history of the operation analysis. The operation analysis check input part is configured to be operated to display the result of the operation analysis.

BRIEF DESCRIPTION OF THE DRAWINGS

FIG. 3A is a flowchart illustrating a process pertaining to an operation analysis;
FIG. 3B is a flowchart illustrating another process pertaining to the operation analysis;
FIG. 9 is a diagram illustrating a third operation analysis screen.

DETAILED DESCRIPTION

The above-described display device, however, merely displays a determination as to the appropriateness of fuel efficiency. An operator therefore cannot understand how the fuel efficiency has been affected by what operations of the operator. The operator therefore cannot understand what specific operations to perform to make it possible to improve the operator's operating efficiency.

In view of the above, it is desired to provide a display device for a shovel that can help to improve the operating efficiency of an operator.

According to an aspect of the present invention, it is possible to provide a display device for a shovel that can help to improve the operating efficiency of an operator.

One or more embodiments of the present invention are described below with reference to the accompanying drawings.

Figure 1:
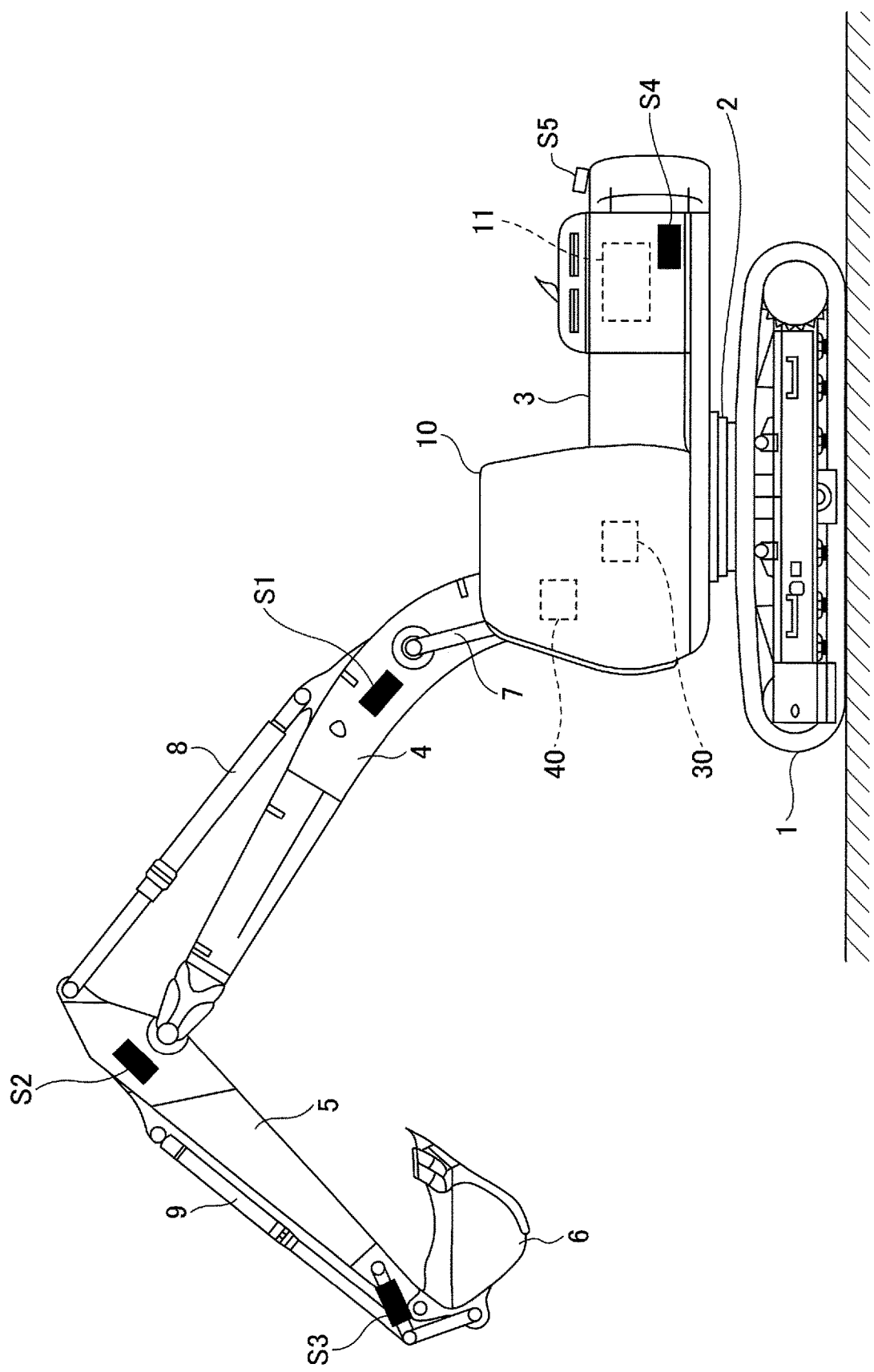
FIG. 1 is a side view of a shovel.

FIG. 1 is a side view of a shovel (an excavator) according to an embodiment of the present invention. An upper turning body 3 is turnably mounted on a lower traveling body 1 of the shovel via a turning mechanism 2. A boom 4 is attached to the upper turning body 3. An arm 5 is attached to an end of the boom 4. A bucket 6 serving as an end attachment is attached to an end of the arm 5. A slope bucket, a dredging bucket, or the like may alternatively be used as an end attachment.

The boom 4, the arm 5, and the bucket 6 form an excavation attachment as an example of an attachment, and are hydraulically driven by a boom cylinder 7, an arm cylinder 8, and a bucket cylinder 9, respectively. A boom angle sensor S1 is attached to the boom 4. An arm angle sensor S2 is attached to the arm 5. A bucket angle sensor S3 is attached to the bucket 6. A bucket tilt mechanism may be provided on the excavation attachment.

The boom angle sensor S1 detects the rotation angle of the boom 4. According to this embodiment, the boom angle sensor S1 is an acceleration sensor that detects the rotation angle of the boom 4 relative to the upper turning body 3 by detecting an inclination to a horizontal plane.

The arm angle sensor S2 detects the rotation angle of the arm 5. According to this embodiment, the a m angle sensor S2 is an acceleration sensor that detects the rotation angle of the arm 5 relative to the boom 4 by detecting an inclination to a horizontal plane.

The bucket angle sensor S3 detects the rotation angle of the bucket 6. According to this embodiment, the bucket angle sensor S3 is an acceleration sensor that detects the rotation angle of the bucket 6 relative to the arm 5 by detecting an inclination to a horizontal plane. When the excavation attachment is provided with a bucket tilt mechanism, the bucket angle sensor S3 additionally detects the rotation angle of the bucket 6 about a tilt axis.

The boom angle sensor S1, the arm angle sensor S2, and the bucket angle sensor S3 may alternatively be potentiometers using a variable resistor, stroke sensors that detect the stroke amount of a corresponding hydraulic cylinder, or rotary encoders that detect a rotation angle about a connecting pin, or may be formed of a combination of an acceleration sensor and a gyro sensor.

A cabin 10 that is a cab is provided and power sources such as an engine 11 are mounted on the upper turning body 3. Furthermore, a turning angular velocity sensor S4 and a camera S5 are attached to the upper turning body 3.

The turning angular velocity sensor S4 is, for example, a gyro sensor, and detects the turning angular velocity of the upper turning body 3. The turning angular velocity sensor S4 may alternatively be a resolver, a rotary encoder, or the like.

The camera S5 obtains an image of the surroundings of the shovel. According to this embodiment, the camera S5 is one or more cameras attached to the back of the upper turning body 3.

A controller 30, a display device, etc., are installed in the cabin 10.

The controller 30 operates as a main control part to control the driving of the shovel. According to this embodiment, the controller 30 is composed of a processing unit including a central processing unit (CPU) and an internal memory. The CPU executes a program stored in the internal memory to implement various functions of the controller 30.

The display device 40 outputs various kinds of information in response to commands from the controller 30. According to this embodiment, the display device 40 is an in-vehicle liquid crystal display directly connected to the controller 30. A touchscreen or the like may be attached. The display device 40 displays operation analysis information that is an analysis of an operator's operations on the shovel. The display device 40 may be a tablet, a cellular phone such as a smartphone, a PC, or the like.

Figure 2:
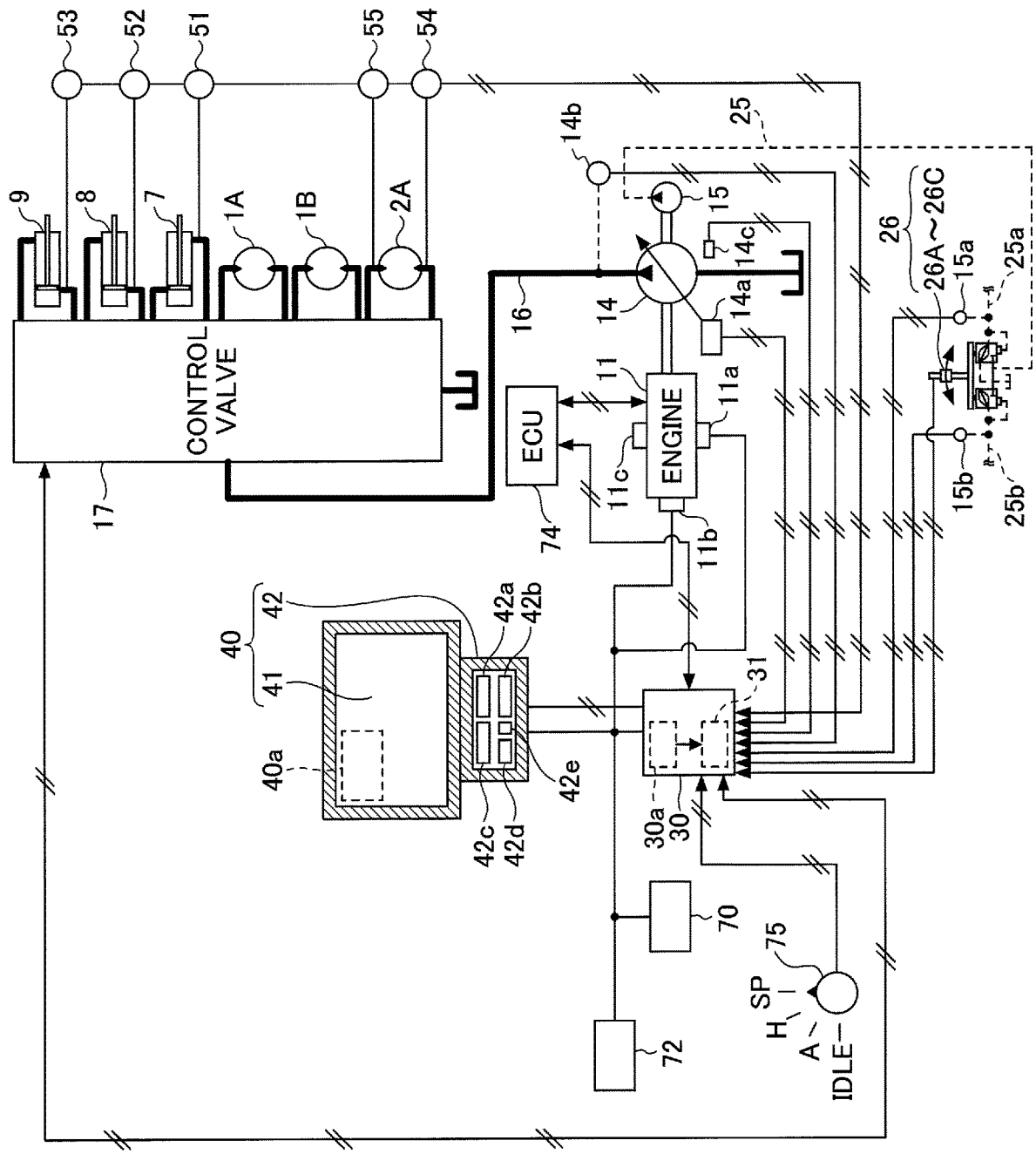
FIG. 2 is a block diagram illustrating a configuration of a basic system installed in the shovel of FIG. 1.

Next, a basic system of the shovel is described with reference to FIG. 2. The basic system of the shovel mainly includes the engine 11, a main pump 14, a pilot pump 15, a control valve 17, an operating apparatus 26, the controller 30, and an engine control unit (ECU) 74.

The engine 11 is the drive source of the shovel, and is, for example, a diesel engine that operates to maintain a predetermined rotational speed. The output shaft of the engine 11 is connected to the respective input shafts of the main pump 14 and the pilot pump 15.

The main pump 14 is a hydraulic pump that supplies hydraulic oil to the control valve 17 via a hydraulic oil line 16, and is a swash-plate variable displacement hydraulic pump, for example. The main pump 14 can change a discharge flow rate, namely, pump output, by adjusting the stroke length of a piston by changing the angle (tilt angle) of a swash plate. The swash plate of the main pump 14 is controlled by a regulator 14a. The regulator 14a includes an electromagnetic proportional valve (not depicted) that adjusts the pressure of hydraulic oil in a hydraulic circuit for controlling the tilt angle of the swash plate. The regulator 14a changes the tilt angle of the swash plate in accordance with a change in a control current to the electromagnetic proportional valve. For example, when the control current increases, the regulator 14a increases the tilt angle of the swash plate to increase the discharge flow rate of the main pump 14. When the control current decreases, the regulator 14a decreases the tilt angle of the swash plate to decrease the discharge flow rate of the main pump 14.

The pilot pump 15 is a hydraulic pump for supplying hydraulic oil to various hydraulic control apparatuses via a pilot line 25, and is a fixed displacement hydraulic pump, for example.

The control valve 17 is a set of hydraulic control valves. The control valve 17 selectively supplies hydraulic oil supplied from the main pump 14 through the hydraulic oil line 16 to one or more of hydraulic actuators in accordance with the direction of operation and the amount of operation of an operating lever 26A, an operating lever 26B, and an operating pedal 26C. The hydraulic actuators include the boom cylinder 7, the arm cylinder 8, the bucket cylinder 9, a traveling hydraulic motor 1A (left), a traveling hydraulic motor 1B (right), and a turning hydraulic motor 2A.

A pressure sensor 51 is connected to the rod-side oil chamber of the boom cylinder 7. The pressure sensor 51 detects the pressure of hydraulic oil in the rod-side oil chamber of the boom cylinder 7. A pressure sensor 52 is connected to the bottom-side oil chamber of the arm cylinder 8. The pressure sensor 52 detects the pressure of hydraulic oil in the bottom-side oil chamber of the atm cylinder 8. A pressure sensor 53 is connected to the bottom-side oil chamber of the bucket cylinder 9. The pressure sensor 53 detects the pressure of hydraulic oil in the bottom-side oil chamber of the bucket cylinder 9.

A pressure sensor 54 and a pressure sensor 55 are connected to the turning hydraulic motor 2A. The pressure sensor 54 detects the pressure of hydraulic oil at a first port of the turning hydraulic motor 2A. The pressure sensor 55 detects the pressure of hydraulic oil at a second port of the turning hydraulic motor 2A.

The operating apparatus 26 is an apparatus that the operator uses to operate hydraulic actuators. The operating apparatus 26 generates a pilot pressure using hydraulic oil supplied from the pilot pump 15 via the pilot line 25, and causes the pilot pressure to act on a pilot port of a flow control valve corresponding to an individual hydraulic actuator through a pilot line 25a or 25b. The pilot pressure acting on the pilot port changes in accordance with the direction of operation and the amount of operation of the operating lever 26A, the operating lever 26B, or the operating pedal 26C corresponding to the individual hydraulic actuator. According to this embodiment, the operating lever 26A is an operating lever placed on the right side of an operator seat, and is used to operate the boom 4 and the bucket 6. The operating lever 26B is an operating lever placed on the left side of the operator seat, and is used to operate the arm 5 and the upper turning body 3.

The controller 30 controls the discharge flow rate of the main pump 14. For example, the controller 30 changes the above-described control current in accordance with a negative control pressure to control the discharge flow rate of the main pump 14 via the regulator 14a.

The ECU 74 controls the engine 11. For example, the ECU 74 controls the amount of fuel injection, etc., to control the rotational speed of the engine 11 based on a command from the controller 30.

An engine rotational speed adjustment dial 75 is a dial for adjusting the rotational speed of the engine 11. According to this embodiment, the engine rotational speed adjustment dial 75 is provided in the cabin 10, and is configured to be able to switch the rotational speed of the engine 11 among four levels. For example, the engine rotational speed adjustment dial 75 is configured to be able to switch the rotational speed of the engine 11 among the four levels of SP mode, H mode, A mode, and idling mode. FIG. 2 illustrates that the SP mode is selected by the engine rotational speed adjustment dial 75.

The SP mode is a rotational speed mode selected when it is desired to prioritize workload, and uses the highest engine rotational speed. The H mode is a rotational speed mode selected when it is desired to satisfy both workload and fuel efficiency, and uses the second highest engine rotational speed. The A mode is a rotational speed mode selected when it is desired to operate the shovel with low noise while prioritizing fuel efficiency, and uses the third highest engine rotational speed. The idling mode is a rotational speed mode selected when it is desired to idle the engine, and uses the lowest engine rotational speed. The engine 11 is controlled to maintain an engine rotational speed corresponding to a rotational speed mode selected by the engine rotational speed adjustment dial 75. The rotational speed of the engine 11 may also be switched among multiple levels whose number is other than four.

The display device 40 is placed near the operator seat of the cabin 10 to assist the operator's operation, for example. The display device 40 includes an image display part 41 and an input part 42. The operator can input information, commands, etc., to the controller 30, using the input part 42 of the display device 40. Furthermore, the display device 40 can provide the operator with information by displaying the operation situation, control information, operation analysis information, etc., of the shovel on the image display part 41.

According to this embodiment, the display device 40 is fixed to a console inside the cab. In general, the boom 4 is placed on the right side when viewed from the operator seated on the operator seat. The operator often operates the shovel while looking at the arm 5 attached to the end of the boom 4 and the bucket 6 attached to the end of the arm 5. Therefore, the right front frame of the cabin 10 is a part that obstructs the operator's view. According to this embodiment, the display device 40 is placed on this part that is an obstruction to the view from the beginning. Therefore, the display device 40 itself is not a significant obstruction to the operator's view. Depending on the frame width, the display device 40 may be so configured as to have the image display part 41 in portrait orientation such that the display device 40 is within the frame width in its entirety.

The display device 40 includes, on the image display part 41, an operation analysis start button serving as an operation analysis start input part for starting an operation analysis and storing a history of operation analyses. Furthermore, the display device 40 includes, on the image display part 41, an operation analysis check button serving as an operation analysis check input part for displaying the result of an operation analysis. The operation analysis start button and the operation analysis check button may be implemented as hardware buttons on the display device 40.

According to this embodiment, the display device 40 is connected to the controller 30 via a communications network such as a Controller Area Network (CAN) or a Local Interconnect Network (LIN). The display device 40 may alternatively be connected to the controller 30 via a dedicated line.

The display device 40 includes a conversion part 40a to generate an image to be displayed on the image display part 41. The conversion part 40a generates an image to be displayed on the image display part 41 based on the output of the controller 30. The display device 40 may include a processing unit including a CPU and an internal memory. The CPU executes a program stored in the internal memory to implement various functions of the display device 40.

The conversion part 40a may be implemented not as a function of the display device 40 but as a function of the controller 30.

The display device 40 includes a switch panel serving as the input part 42. The switch panel is a panel including various kinds of hardware switches. According to this embodiment, the switch panel includes a light switch 42a, a windshield wiper switch 42b, a window washer switch 42c, a screen switching button 42d, and a cursor moving button 42e, which are hardware buttons. The light switch 42a is a switch for turning on and off lights attached to the exterior of the cabin 10. The windshield wiper switch 42b is a switch for moving and stopping a windshield wiper. The window washer switch 42c is a switch for spraying windshield washer fluid. The screen switching button 42d is a button for switching screens displayed on the image display part 41 of the display device 40. The cursor moving button 42e is a button for moving a selection area (cursor area) displayed on the image display part 41 of the display device 40 to select and determine various setting items.

The display device 40 is supplied with electric power from a rechargeable battery 70 to operate. The rechargeable battery 70 is charged with electric power generated in an alternator 11a (generator) of the engine 11. The electric power of the rechargeable battery 70 is also supplied to electrical equipment 72, etc., of the shovel besides the controller 30 and the display device 40. Furthermore, a starter 11b of the engine 11 is driven with electric power from the rechargeable battery 70 to start the engine 11.

The engine 11 is controlled by the ECU 74. The ECU 74 transmits various data indicating the condition of the engine 11 to the controller 30. Examples of the various data include data indicating coolant water temperature (a physical quantity) detected with a water temperature sensor 11c.

Various data are fed to the controller 30 as follows. The regulator 14a of the main pump 14 transmits data indicating the tilt angle of the swash plate to the controller 30. A discharge pressure sensor 14b transmits data indicating the discharge pressure of the main pump 14 to the controller 30. These data representing physical quantities are stored in a primary storage part 30a. An oil temperature sensor 14c is provided in a conduit between the main pump 14 and a tank storing hydraulic oil that the main pump 14 draws in. The oil temperature sensor 14c transmits data representing the temperature of hydraulic oil flowing through the conduit to the controller 30.

A pilot pressure transmitted to the control valve 17 through the pilot line 25a or 25b when the operating lever 26A, the operating lever 26B, or the operating pedal 26C is operated is detected by oil pressure sensor 15a or 15b. The oil pressure sensors 15a and 15b transmit data indicating the detected pilot pressure to the controller 30. The pressure sensors 51 through 55 transmit their respective pressure values to the controller 30.

The engine rotational speed adjustment dial 75 transmits data indicating the setting of the engine rotational speed to the controller 30.

The controller 30 stores data in the primary storage part 30a. The primary storage part 30a is a device for storing various kinds of information. According to this embodiment, the primary storage part 30a is a non-volatile storage medium such as a semiconductor memory. Alternatively, however, the primary storage part 30a may be a volatile storage medium.

When accumulated for a predetermined capacity, data stored in the primary storage part 30a are overwritten by new data. According to this embodiment, for example, when a currently detected pressure value exceeds a threshold, the controller 30 transfers past detection values (hereinafter also referred to as operation history) stored in the primary storage part 30a to a main storage part 31. The main storage part 31 is a non-volatile storage medium.

The main storage part 31 or the primary storage part 30a may store reference data related to shovel operations, which the controller 30 uses in an operation analysis. The reference data are data related to shovel operations, and are data related to ideal operational details represented by the timing of operation, the direction of operation, the amount of operation, etc., of an operating lever, for example.

The controller 30 performs an operation analysis based on pilot pressures from the oil pressure sensors 15a and 15b, pressure values from the pressure sensors 51 through 55, and a discharge pressure from the discharge pressure sensor 14b, displays the result of the operation analysis on the image display part 41 of the display device 40.

Furthermore, the controller 30 compares the data of the operation analysis with the reference data stored in the main storage part 31 or the primary storage part 30a to calculate an example of improvement, and displays the example of improvement on the image display part 41 of the display device 40 as the result of the operation analysis. The example of improvement is data related to shovel operations for reducing a difference between the reference data and the data of the operation analysis, and is stored in the main storage part 31. The example of improvement is represented by, for example, the timing of operation, the direction of operation, or the amount of operation of an operating lever or a combination thereof.

Next, a flow of a process related to an operation analysis is specifically described with reference to FIGS. 3A and 3B. FIG. 3A is a flowchart illustrating a process of starting an operation analysis. FIG. 3B is a flowchart illustrating a process of displaying the result of an operation analysis on the image display part 41.

As illustrated in FIG. 3A, in the case of desiring an operation analysis, an operator presses an operation analysis start button displayed on the image display part 41 to input an operation analysis start (ST1). Then, the operator operates the shovel.

The controller 30 then obtains pressure values from oil pressure sensors. According to this embodiment, the controller 30 obtains pilot pressures from the oil pressure sensors 15a and 15b, pressure values from the pressure sensors 51 through 55, a discharge pressure from the discharge pressure sensor 14b, etc. The controller 30 compares the obtained pressure values with the reference data stored in the primary storage part 30a or the main storage part 31 to determine whether there is a pressure value exceeding a threshold (ST2).

If none of the obtained pressure values exceeds a threshold (NO at ST2), the controller 30 repeats the determination of ST2.

If there is a pressure value exceeding a threshold (YES at ST2), the controller 30 stores an operation situation before and after a point of time at which the threshold is exceeded in the main storage part 31 as an operation analysis history (ST3). A period for which the operation situation is stored is, for example, five seconds before and after the point of time at which the threshold is exceeded.

Figure 4:
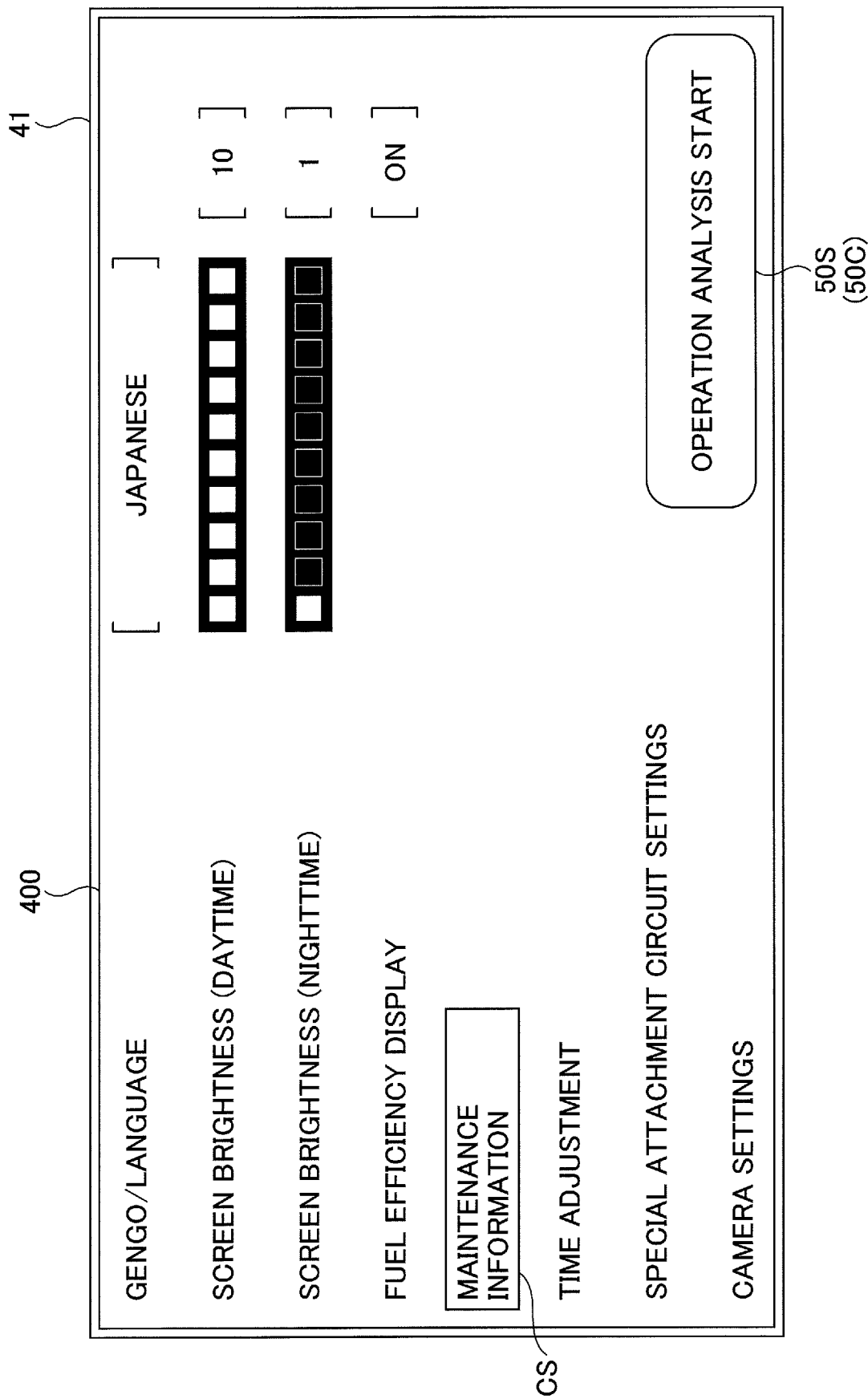
FIG. 4 is a diagram illustrating a screen in the case of starting the operation analysis.
Figure 5:
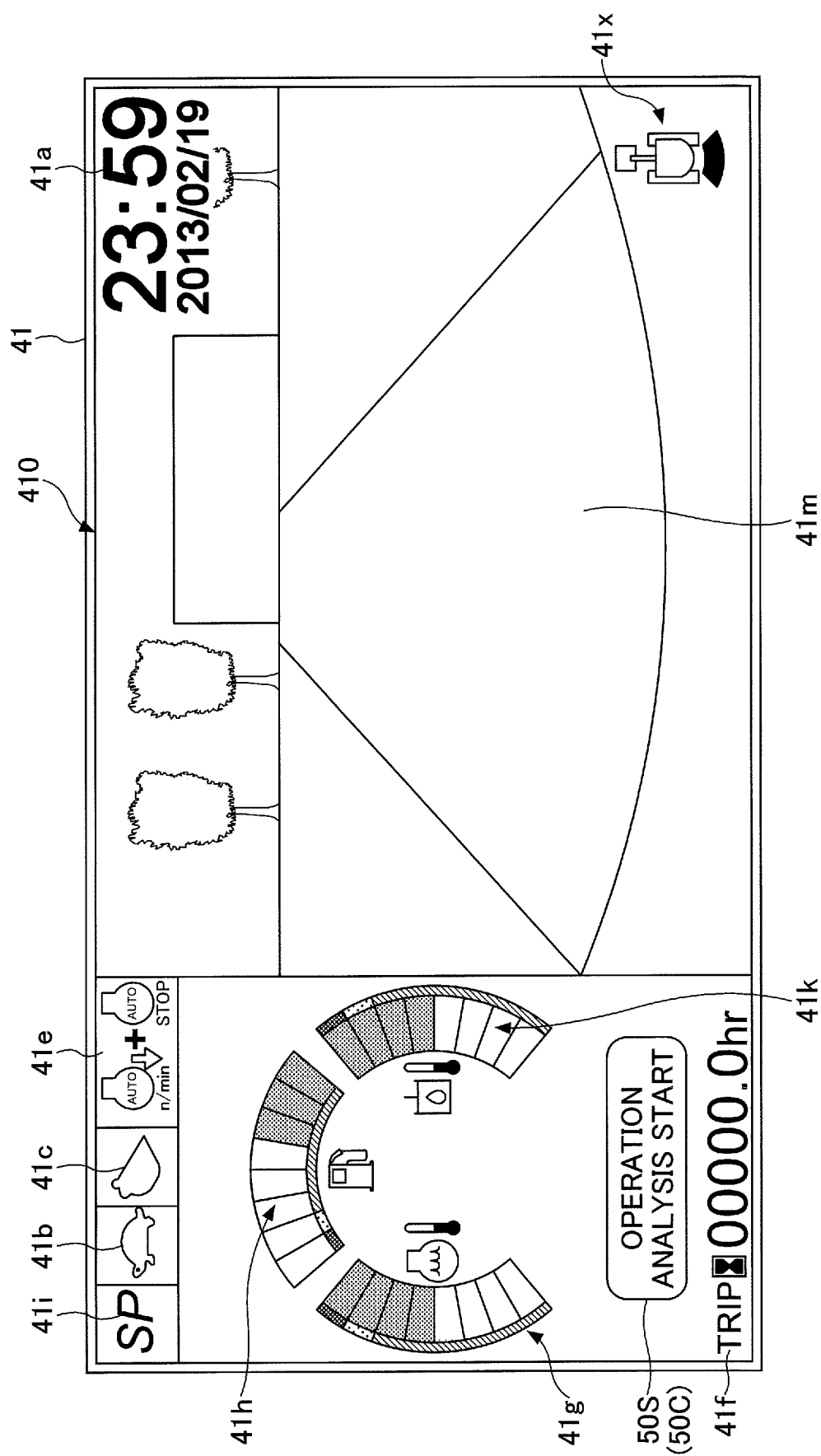
FIG. 5 is a diagram illustrating another screen in the case of starting the operation analysis.

Here, an example of an operation analysis start button 50S displayed on the image display part 41 is described with reference to FIGS. 4 and 5. FIG. 4 is a diagram illustrating a screen in the case of starting an operation analysis. FIG. 5 is a diagram illustrating another screen in the case of starting an operation analysis.

The operation analysis start button 50S is displayed on a menu screen 400. The menu screen 400 is a screen displayed at the start of a shovel operation.

Accordingly, the operator can input starting an operation analysis of the operator's shovel operation. When the operator presses the operation analysis start button 50S on the menu screen 400, the operation analysis start button 50S switches to an operation analysis check button 50C. Alternatively, however, the operation analysis start button 50S and the operation analysis check button 50C may both be displayed on the menu screen 400.

Various setting items are displayed on the menu screen 400. According to this embodiment, a cursor area CS serving as a selection area movable over the setting items is displayed on the image display part 41. The operator can switch languages, adjust screen brightness, etc., by moving the cursor area CS. In addition, the operator can perform switching to a maintenance information screen, a time adjustment screen, etc. The operator can move the cursor area CS using the cursor moving button 42e illustrated in FIG. 2. When the image display part 41 is a touchscreen, the operator may move the cursor area CS by a touch operation.

The operation analysis start button 50S may also be displayed on a main screen 410 illustrated in FIG. 5. The main screen 410 is a screen displayed during a shovel operation. The operator switches the menu screen 400 illustrated in FIG. 4 and the main screen 410 illustrated in FIG. 5, using the screen switching button 42d illustrated in FIG. 2.

As illustrated in FIG. 5, the main screen 410 includes a date and time display area 41a, a traveling mode display area 41b, an end attachment display area 41c, an engine control status display area 41e, an engine operating time display area 41f, a coolant water temperature display area 41g, a remaining fuel amount display area 41h, a rotational speed mode display area 41i, a hydraulic oil temperature display area 41k, a camera image display area 41m, an orientation indicator icon 41x, and the operation analysis start button 50S. The traveling mode display area 41b, the end attachment display area 41c, the engine control status display area 41e, the rotational speed mode display area 41i, and the orientation indicator icon 41x are specific examples of the settings display part of the shovel. The engine operating time display area 41f, the coolant water temperature display area 41g, the remaining fuel amount display area 41h, and the hydraulic oil temperature display area 41k are specific examples of the operating condition display part of the shovel.

When the operator presses the operation analysis start button 50S on the main screen 410, the operation analysis start button 50S switches to the operation analysis check button 50C. Alternatively, however, the operation analysis start button 50S and the operation analysis check button 50C may both be displayed on the main screen 410.

The date and time display area 41a displays a current date and time. The traveling mode display area 41b displays a current traveling mode. The traveling mode represents the setting of traveling hydraulic motors. Specifically, the traveling mode includes a low-speed mode and a high-speed mode. The low-speed mode is represented by, for example, a "turtle"-shaped mark, and the high-speed mode is represented by, for example, a "rabbit"-shaped mark.

The end attachment display area 41c displays an image that represents the type of a currently attached end attachment. In FIG. 5, a bucket-shaped mark is displayed. The engine control status display area 41e displays the control status of the engine 11. In FIG. 5, the operator can recognize that "automatic deceleration and automatic stop mode" is selected as the control status of the engine 11. Other control statuses of the engine 11 include "automatic deceleration mode," "automatic stop mode," and "manual deceleration mode."

The engine operating time display area 41f displays the cumulative operating time of the engine 11. In FIG. 5, a value using a unit "hr (hour)" is displayed. The coolant water temperature display area 41g displays the current temperature condition of engine coolant water. The remaining fuel amount display area 41h displays the status of the remaining amount of fuel stored in a fuel tank.

The rotational speed mode display area 41i displays a current rotational speed mode. The rotational speed mode includes, for example, the four modes of SP mode, H mode, A mode, and idling mode. In FIG. 5, a symbol "SP" representing SP mode is displayed. The hydraulic oil temperature display area 41k displays the temperature condition of hydraulic oil in a hydraulic oil tank.

The camera image display area 41m displays a camera image. According to this embodiment, the shovel includes the camera S5 (see FIG. 1) for capturing images of the outside of the operator's view. The camera S5 transmits a captured camera image to the conversion part 40a of the display device 40. As a result, the operator can visually recognize the camera image captured by the camera S5 on the main screen 410 of the display device 40.

The orientation indicator icon 41x represents the relative relationship between the orientation of a camera that has captured a camera image that is displayed in the camera image display area 41m and the orientation of the shovel (the attachment of the upper turning body 3).

The operation analysis start button 50S is desirably displayed between the engine operating time display area 41f and the coolant water temperature display area 41g on the main screen 410, but may alternatively be displayed in other areas on the main screen 410.

As illustrated in FIG. 5, the operation analysis start button 50S is displayed on the main screen 410 that is displayed during an operation of the shovel. Therefore, even during a shovel operation, the operator can start an operation analysis of the operator's shovel operation by pressing the operation analysis start button 50S.

Next, a process of displaying the result of an operation analysis on the image display part 41 of the display device 40 is specifically described with reference to FIG. 3B.

As illustrated in FIG. 3B, when desiring to check the result of an operation analysis, the operator presses the operation analysis check button 50C displayed on the image display part 41 (ST21). When the operator presses the operation analysis start button 50S at ST21, the controller 30 starts an operation analysis. When the operation analysis ends, the display device 40 switches the operation analysis start button 50S to the operation analysis check button 50C on the menu screen 400 or the main screen 410. Accordingly, the operation analysis check button 50C is displayed at the position of the operation analysis start button 50S on the menu screen 400 of FIG. 4 or the main screen 410 of FIG. 5. The operator can view operation analysis information on the operator's shovel operation by pressing the operation analysis check button 50C when performing no shovel operation such as while waiting for a dump truck.

Figure 6:
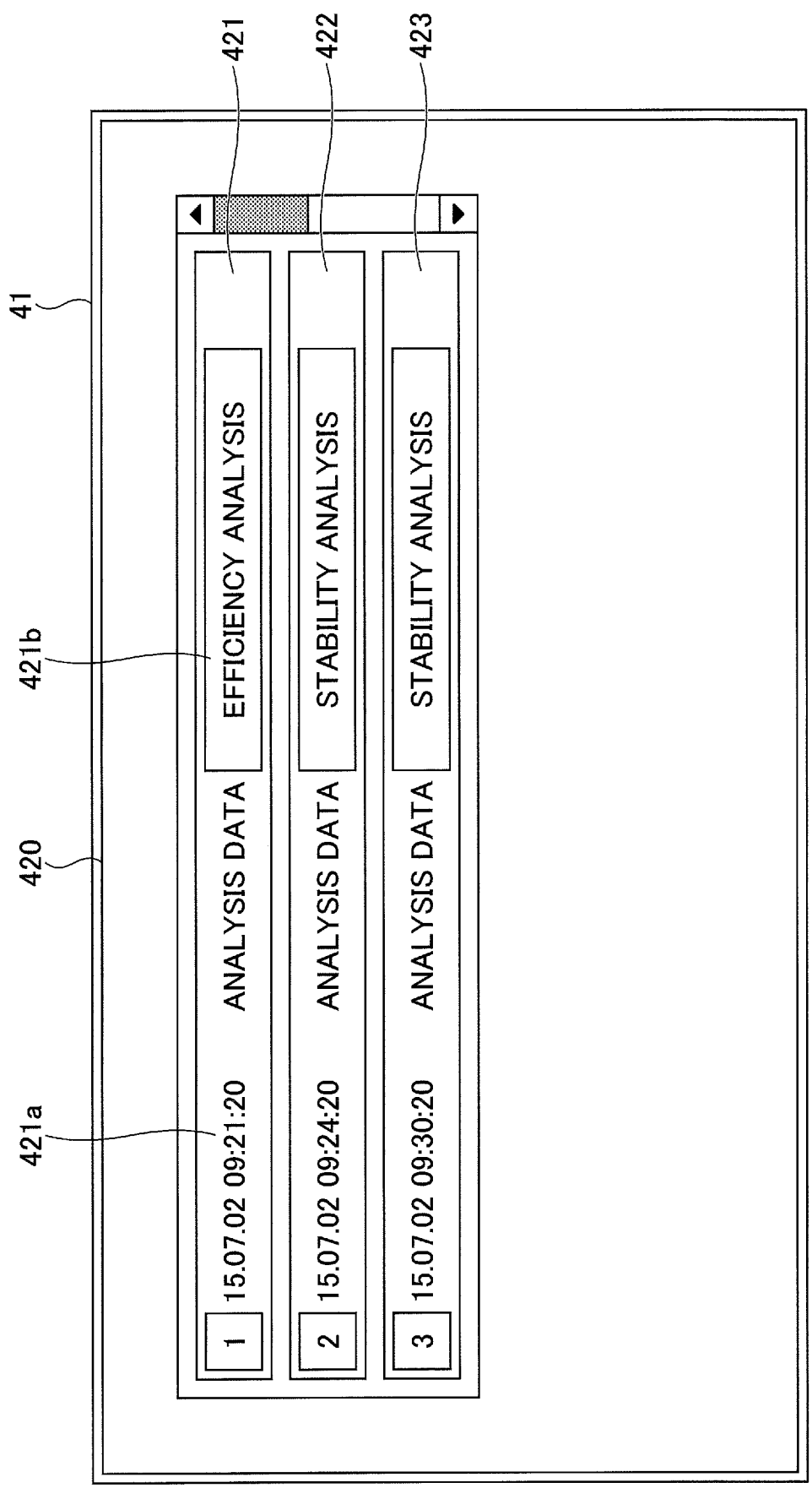
FIG. 6 is a diagram illustrating a history screen.

In response to the pressing of the operation analysis check button 50C by the operator at ST21, the display device 40 displays a history screen 420 illustrated in FIG. 6 on the image display part 41 (ST22). A list of operation analysis histories that the controller 30 stores in the main storage part 31 at ST3 of FIG. 3A is displayed on the history screen 420.

The history screen 420 illustrated in FIG. 6 can display multiple operation analysis histories such as operation analysis histories 421 through 423. For example, in the operation analysis history 421 as depicted, date and time data 421a of when a threshold was exceeded and an analysis type 421b are displayed. The same information is displayed with respect to the other operation analysis histories 422 and 423. According to this embodiment, an "efficiency analysis" and a "stability analysis" are displayed as the analysis type 421b. The efficiency analysis is displayed when a pressure value exceeding a threshold is detected by the controller 30. The stability analysis is displayed when an acceleration exceeding a threshold is detected by the controller 30.

Figure 7:
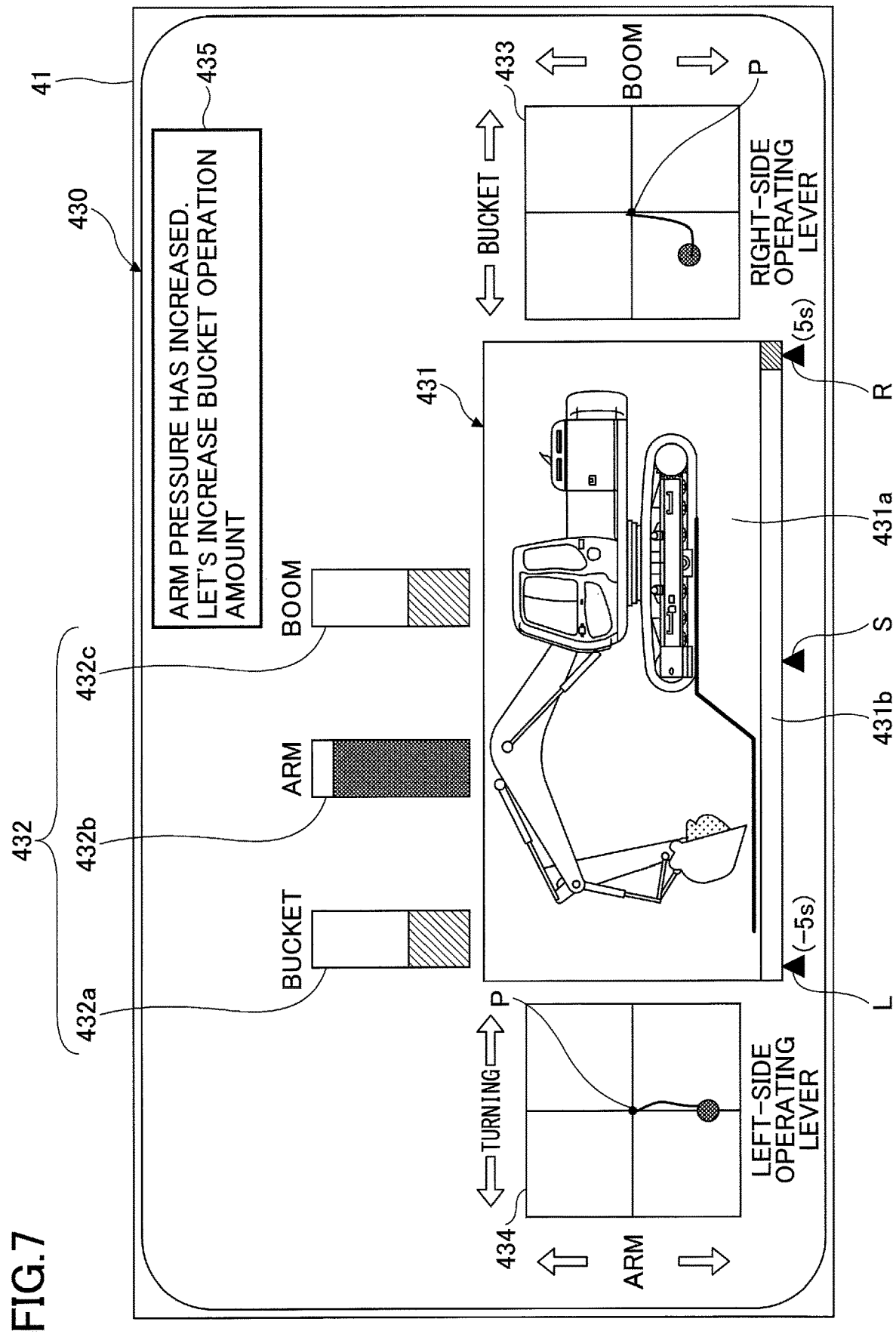
FIG. 7 is a diagram illustrating a first operation analysis screen.

When the operator selects a desired operation analysis history from the list of operation analysis histories of the history screen 420 (ST23), the display device 40 displays a first operation analysis screen 430 illustrated in FIG. 7 on the image display part 41 (ST24). FIG. 7 illustrates a screen that is displayed when the operator selects the operation analysis history 421 on the history screen 420. The operation analysis history 421 relates to an excavating time operation.

The first operation analysis screen 430 includes a shovel motion display area 431, a cylinder pressure display area 432, a right-side operating lever display area 433, a left-side operating lever display area 434, and a message display area 435.

The shovel motion display area 431 displays the result of an operation analysis performed by the controller 30, using a model of the shovel. According to this embodiment, the motion of the shovel based on an operation history of five seconds before and after a point of time at which a predetermined detection value exceeds a predetermined threshold (ten seconds in total) is reproduced in animation. Data on operation histories are stored in the main storage part 31. A model of the shovel is, for example, a computer graphic model (CG model).

The shovel motion display area 431 includes a motion display part 431a that reproduces an operation history in animation with a CG model of the shovel and a seek bar 431b that indicates the position of reproduction of the motion display part 431a. The seek bar 431b is a horizontally extending bar whose length corresponds to the reproduction time of animation. Accordingly, in the seek bar 431b of FIG. 7, a point of time at which a detection value exceeds a threshold is indicated by a central position S, a point of time five seconds before a point of time at which a detection value exceeds a threshold (−5 s) is indicated by a left-end position L, and a point of time five seconds after a point of time at which a detection value exceeds a threshold (+5 s) is indicated by a right-end position R.

The display areas illustrated in FIG. 7 show a state at a point of time five seconds after a point of time at which a detection value exceeds a threshold.

The cylinder pressure display area 432 displays the result of an operation analysis performed by the controller 30 with the bar graph representation of the respective cylinder pressures of the bucket cylinder 9, the arm cylinder 8, and the boom cylinder 7 that are linked to the movement of the attachment. The bar graph representation of cylinder pressures displayed in the cylinder pressure display area 432 is a graphic representation of cylinder pressures, and is linked to the animated motion of the shovel displayed in the motion display part 431a. The graphic representation of cylinder pressures may alternatively be a round analog meter representation, a seven-segment number representation, or the like.

The cylinder pressure display area 432 includes a bucket pressure display part 432a that displays the cylinder pressure of the bucket cylinder 9, an arm pressure display part 432b that displays the cylinder pressure of the arm cylinder 8, and a boom pressure display part 432c that displays the cylinder pressure of the boom cylinder 7.

In FIG. 7, the bucket pressure display part 432a displays the bottom-side cylinder pressure of the bucket cylinder 9. The arm pressure display part 432b displays the bottom-side cylinder pressure of the arm cylinder 8. The boom pressure display part 432c displays the rod-side cylinder pressure of the boom cylinder 7.

The cylinder pressure display area 432 illustrated in FIG. 7 shows that the pressure of the arm 5 is higher than the pressure of the bucket 6. This means that it is highly likely that the operator is forcibly excavating with the arm 5. The arm pressure display part 432b illustrated in FIG. 7 is displayed in, for example, red. The arm pressure display part 432b may be displayed in red when the pressure of the arm cylinder 8 becomes higher than or equal to a threshold. The same is the case with the bucket pressure display part 432a and the boom pressure display part 432c. The pressure value of the arm pressure display part 432b illustrated in FIG. 7 shows the largest pressure during the display period (ten seconds).

The right-side operating lever display area 433 displays the operation track of the operating lever 26A placed on the right side of the operator seat in a plan view. In FIG. 7, the right-side operating lever display area 433 is a square display area, where a central position P indicates the reference position (neutral position) of the operating lever 26A. The right-side operating lever display area 433 corresponds to the operation of the operating lever 26A, and a forward (upward) direction corresponds to the operation of lowering the boom 4 and a backward (downward) direction corresponds to the operation of raising the boom 4. Furthermore, a leftward direction corresponds to the operation of closing the bucket 6, and a rightward direction corresponds to the operation of opening the bucket 6. The right-side operating lever display area 433 displays the operation track of the operating lever 26A in conjunction with the animated motion of the shovel displayed in the motion display part 431a.

The left-side operating lever display area 434 displays the operation track of the operating lever 26B placed on the left side of the operator seat in a plan view. In FIG. 7, the left-side operating lever display area 434 is a square display area, where a central position P indicates the reference position (neutral position) of the operating lever 26B. The left-side operating lever display area 434 corresponds to the operation of the operating lever 26B, and a forward (upward) direction corresponds to the operation of opening the arm 5 and a backward (downward) direction corresponds to the operation of closing the arm 5. Furthermore, a leftward direction corresponds to a leftward turning operation, and a rightward direction corresponds to a rightward turning operation. The left-side operating lever display area 434 displays the operation track of the operating lever 26B in conjunction with the animated motion of the shovel displayed in the motion display part 431a.

The message display area 435 displays the result of an operation analysis and an improvement method with a message. Accordingly, the operator can objectively recognize how the operator actually operates levers by checking the right-side operating lever display area 433, the left-side operating lever display area 434, and the cylinder pressure display area 432.

For example, from the display of the first operation analysis screen 430 illustrated in FIG. 7, the operator who is a target of analysis understands that the following operations have been performed. Specifically, from the display of the left-side operating lever display area 434, the operator understands that the operating lever 26B is operated in a closing direction in one attempt when operating the arm 5 in a closing direction. Furthermore, from the display of the right-side operating lever display area 433, the operator understands that the boom 4 was gradually operated in a rising direction with the closing operation of the arm 5, and understands that the bucket 6 was operated in a closing direction at the last stage of excavation.

It is understood from the display of the cylinder pressure display area 432, however, that these operations are operations that apply a high pressure only to the arm cylinder 8. Accordingly, in the message display area 435 illustrated in FIG. 7, a message that reads "ARM PRESSURE HAS INCREASED. LET'S INCREASE BUCKET OPERATION AMOUNT" is displayed.

By checking the results of operation analyses displayed on the first operation analysis screen 430, the operator can objectively recognize the current state of the operator's shovel operations as described above, and can also take a hint for the improvement of the operational ability.

In this manner, the image display part 41 can display the result of an operation analysis. The form of display of the result of an operation analysis displayed on the image display part 41, however, is not limited to the first operation analysis screen 430 illustrated in FIG. 7. For example, the display device 40 may display the first operation analysis screen 430 illustrated in FIG. 7 on the image display part 41 and thereafter display a second operation analysis screen 440 illustrated in FIG. 8 on the image display part 41.

The second operation analysis screen 440 displays an improvement on the operator's operation history as the result of an operation analysis. Accordingly, by checking the second operation analysis screen 440, the operator can understand what specific improvement to make to improve the operational ability.

The second operation analysis screen 440 includes a shovel motion display area 441, a cylinder pressure display area 442, a right-side operating lever display area 443, a left-side operating lever display area 444, and a message display area 445. The second operation analysis screen 440 has substantially the same display area and is in substantially the same form of display as the first operation analysis screen 430. Therefore, a description of a common part is omitted, and a description is focused on differences.

The shovel motion display area 441 displays an improvement on the operator's operation history in animation with a CG model of the shovel. According to this embodiment, an improvement on an operation history of five seconds before and after a point of time at which a predetermined detection value exceeds a predetermined threshold (ten seconds in total) is reproduced in animation.

The cylinder pressure display area 442 displays an improvement on the operator's operation history with the bar graph representation of the respective cylinder pressures of the bucket cylinder 9, the arm cylinder 8, and the boom cylinder 7 that are linked to the movement of the attachment. The bar graph representation of cylinder pressures displayed in the cylinder pressure display area 442 is linked to the animated motion of the shovel displayed in a motion display part 441a.

Figure 8:
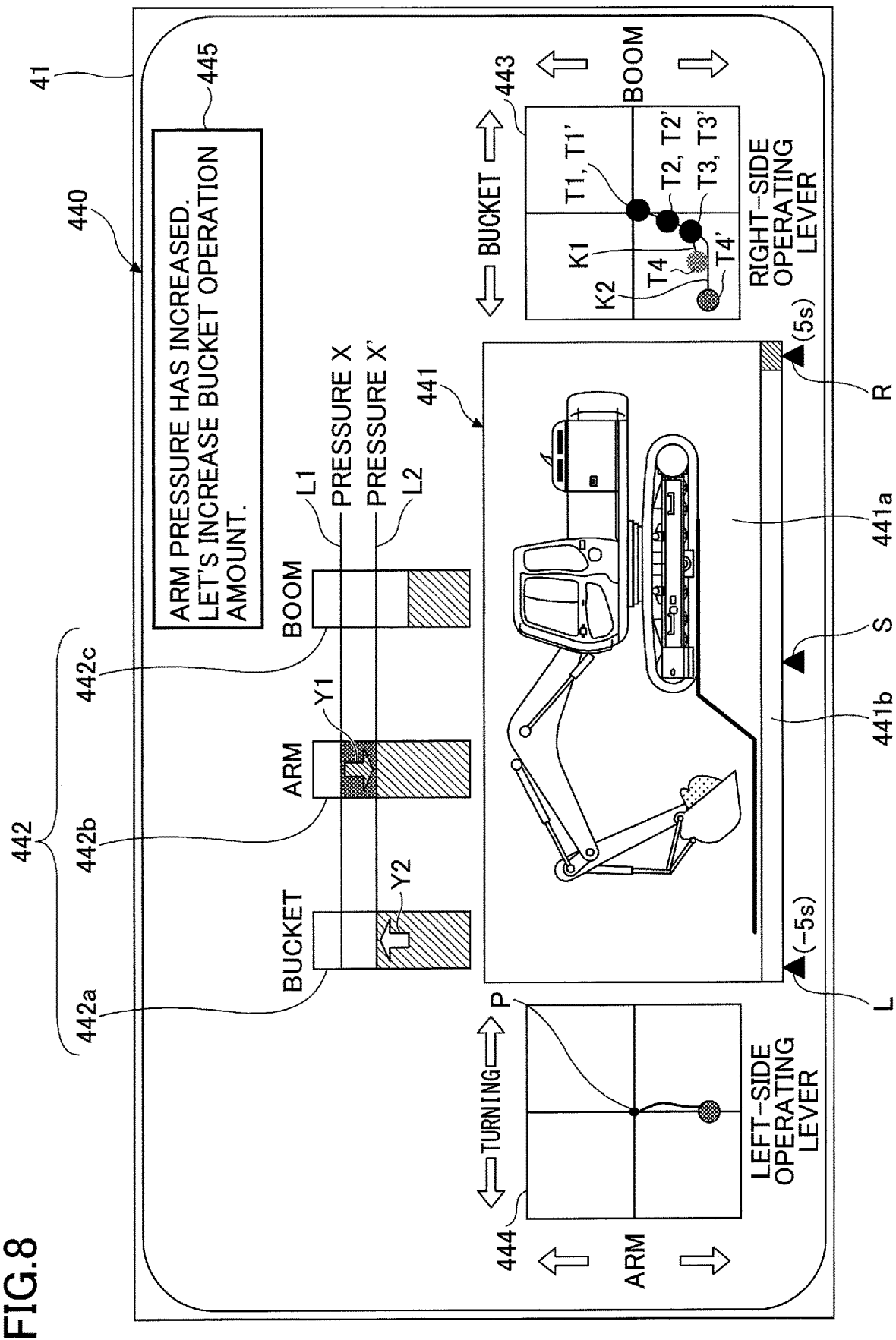
FIG. 8 is a diagram illustrating a second operation analysis screen.

Furthermore, the cylinder pressure display area 442 displays a level line L1 indicating a maximum cylinder pressure X calculated by the controller 30 in an operation analysis and a level line L2 indicating a target cylinder pressure X' serving as an improvement. In FIG. 8, an arm pressure display part 442b displays the inside of an area between the level line L1 and the level line L2 in red, and displays an arrow icon Y1 giving an instruction to decrease the cylinder pressure to the level line L2. A bucket pressure display part 442a displays an arrow icon Y2 giving an instruction to increase the cylinder pressure to the level line L2.

The level lines L1 and L2 illustrated in FIG. 8 are shared by the bucket pressure display part 442a, the arm pressure display part 442b, and a boom pressure display part 442c. The level lines L1 and L2, however, may alternatively be displayed in each of the bucket pressure display part 442a, the arm pressure display part 442b, and the boom pressure display part 442c independently.

The right-side operating lever display area 443 displays the operation track of the operating lever 26A with respect to an improvement in a plan view. The right-side operating lever display area 443 corresponds to the operation of the operating lever 26A with respect an improvement. Specifically, forward and backward (upward and downward) directions correspond to the lowering and raising of the boom 4 and leftward and rightward directions correspond to the closing and opening of the bucket 6. The right-side operating lever display area 443 displays the operation track of the operating lever 26A with respect to an improvement in conjunction with the animated motion of the shovel displayed in the motion display part 441a.

The left-side operating lever display area 444 displays the operation track of the operating lever 26B with respect to an improvement in a plan view. The left-side operating lever display area 444 corresponds to the operation of the operating lever 26B with respect an improvement. Specifically, forward and backward (upward and downward) directions correspond to the opening and closing of the arm 5, a leftward direction corresponds to leftward turning, and a rightward direction corresponds to rightward turning. The left-side operating lever display area 444 displays the operation track of the operating lever 26B with respect to an improvement in conjunction with the animated motion of the shovel displayed in the motion display part 441a.

The right-side operating lever display area 443 illustrated in FIG. 8 displays an operation track K1 of the operating lever 26A according to an operation analysis performed by the controller 30 and an operation track K2 of the operating lever 26A showing an improvement based on the result of the operation analysis.

The operation track K1 shows an operation track based on an operation analysis of the operating lever 26A during a period from Time T1 to Time T4. The operation track K2 shows an operation track based on an improvement of the operating lever 26A during a period from Time T1' to Time T4'. Time T1 through Time T4 correspond to Time T1' through Time T4', respectively.

The operation track K2 illustrated in FIG. 8 gives an instruction to increase the amount of operation of the bucket 6 between Time T3' and Time T4'.

The message display area 445 displays the result of an operation analysis and an improvement method with a message. In the message display area 445 illustrated in FIG. 8, a message that reads "ARM PRESSURE HAS INCREASED. LET'S INCREASE BUCKET OPERATION AMOUNT" is displayed.

By checking an improvement displayed on the second operation analysis screen 440, the operator can intuitively understand what specific lever operation can improve the operational ability.

By looking at the left-side operating lever display area 444, the operator understands that the operating lever 26B is operated in a closing direction in one attempt when operating the arm 5 in a closing direction. Furthermore, by looking at the operation track K1 of the right-side operating lever display area 443, the operator understands that the boom 4 was gradually operated in a rising direction with the closing operation of the arm 5, and understands that the bucket 6 was operated in a closing direction at the last stage of excavation.

Furthermore, by paying attention to the operation track K2 of the right-side operating lever display area 443, the operator understands, at a glance, how to operate the operating lever 26A to be able to improve shovel operations. The operation track K2 illustrated in FIG. 8 indicates no need to improve the operation between Time T1' and Time T3', while indicating the necessity of increasing the amount of operation of the bucket 6 by further tilting the operating lever 26A leftward between Time T3' and Time T4'. Therefore, the operator can understand the necessity of the operation of tilting the operating lever 26A leftward between Time T3' and Time T4'.

According to the above-described embodiment, the display device 40 displays the first operation analysis screen 430 and the second operation analysis screen 440 as separate screens. The display device 40, however, may alternatively display the first operation analysis screen 430 and the second operation analysis screen 440 in the same screen. As another alternative, the display device 40 may display at least one of the first operation analysis screen 430 and the second operation analysis screen 440 and at least one of a camera image, the settings display part, and the operating condition display part on separate screens or simultaneously on the same screen.

FIG. 9 illustrates a third operation analysis screen 450 including a first operation analysis screen and a second operation analysis screen. The third operation analysis screen 450 illustrated in FIG. 9 includes an operation history display area 451 in which the first operation analysis screen 430 illustrated in FIG. 7 is displayed and an improvement display area 452 in which the second operation analysis screen 440 illustrated in FIG. 8 is displayed. A reproduction time with respect to the seek bar 431b of the operation history display area 451 is equal to a reproduction time with respect to a seek bar 441b of the improvement display area 452.

The third operation analysis screen 450 has the operation history display area 451 and the improvement display area 452 vertically arranged. Therefore, it is possible to highlight a difference between an actual operation history and an improvement, and it is possible to suggest or teach a specific improvement with respect to shovel operations to the operator in an easily understandable manner.

Furthermore, the motion of the bucket 6 is quicker in an improvement taught in the improvement display area 452 than in the actual operation history of the operator displayed in the operation history display area 451, thus contributing to smooth excavation work.

One or more embodiments of the present invention are described in detail above. The present invention, however, is not limited to the above-described one or more embodiments. Variations and replacements may be applied to the above-described one or more embodiments without departing from the scope of the present invention.

What is claimed is:

1. A display device for a shovel, the shovel including an attachment, the attachment including a boom, an arm, and an end attachment that are driven by a boom cylinder, an arm cylinder, and an end attachment cylinder, respectively, the display device comprising:
   a first button configured to be operated to start an operation analysis of the shovel and store a history of the operation analysis; and
   a second button configured to be operated to display a result of the operation analysis and an operation history of the shovel on a same screen, the operation history of the shovel including an operation history of the boom cylinder, an operation history of the arm cylinder, and an operation history of the end attachment cylinder that are separately displayed on the same screen.

2. The display device for the shovel as claimed in claim 1, wherein the operation history of the shovel is displayed using a model of the shovel.

3. The display device for the shovel as claimed in claim 1, wherein each of the operation history of the boom cylinder, the operation history of the arm cylinder, and the operation history of the end attachment cylinder is displayed using a cylinder pressure linked to a movement of the attachment.

4. The display device for the shovel as claimed in claim 1, wherein the operation history of the shovel is displayed by displaying a track of an operating lever for operating the attachment.

5. The display device for the shovel as claimed in claim 1, wherein an improvement on the operation history of the shovel is displayed using a model of the shovel.

6. The display device for the shovel as claimed in claim 1, wherein an improvement on each of the operation history of the boom cylinder, the operation history of the arm cylinder, and the operation history of the end attachment cylinder is displayed using a cylinder pressure linked to a movement of the attachment.

7. The display device for the shovel as claimed in claim 1, wherein an improvement on the operation history of the shovel is displayed displaying a track of an operating lever for operating the attachment.

8. The display device for the shovel as claimed in claim 1, wherein the result of the operation analysis and a camera image are simultaneously displayed.

9. The display device for the shovel as claimed in claim 1, wherein the result of the operation analysis and a part for displaying settings of the shovel are simultaneously displayed.

10. The display device for the shovel as claimed in claim 1, wherein the result of the operation analysis and a part that displays an operating condition of the shovel are simultaneously displayed.

11. The display device for the shovel as claimed in claim 1, further comprising:
  a plurality of sensors configured to detect pressures of hydraulic oil in the boom cylinder, the arm cylinder, and the bucket cylinder,
  wherein the operation history of the boom, cylinder, the operation history of the arm cylinder, and the operation history of the end attachment cylinder graphically represent the detected pressure of the boom cylinder, the detected pressure of the arm cylinder, and the detected pressure of the bucket cylinder, respectively.

12. The display device for the shovel as claimed in claim 1, wherein the result of the operation analysis is displayed in a form of a message with respect to the operation history of the boom cylinder, the operation history of the arm cylinder, and the operation history of the end attachment cylinder.

13. The display device for the shovel as claimed in claim 1, wherein each of the operation history of the boom cylinder, the operation history of the arm cylinder, and the operation history of the end attachment cylinder is displayed in relation to time.

14. The display device for the shovel as claimed in claim 1, wherein
  the operation history of the shovel further includes an animation that reproduces the operation history of the shovel using a model of the shovel, and
  each of the operation history of the boom cylinder, the operation history of the arm cylinder, and the operation history of the end attachment cylinder is displayed as a graphic representation of a cylinder pressure that is linked to a movement of the animation.

* * * * *